United States Patent
Suzuki et al.

(10) Patent No.: US 8,107,330 B2
(45) Date of Patent: Jan. 31, 2012

(54) INFORMATION RECORDING AND REPRODUCING APPARATUS

(75) Inventors: Yoshihisa Suzuki, Ichinomiya (JP); Satoshi Sumi, Gifu (JP); Toshihide Hamaguchi, Higashiosaka (JP); Kenji Nakao, Gifu (JP); Noboru Mamiya, Mizuho (JP); Hideharu Toda, Katano (JP); Tomohiro Goto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 1967 days.

(21) Appl. No.: 11/048,815

(22) Filed: Feb. 3, 2005

(65) Prior Publication Data
US 2005/0180278 A1 Aug. 18, 2005

(30) Foreign Application Priority Data
Feb. 12, 2004 (JP) ................................. 2004-34396

(51) Int. Cl.
*G11B 7/00* (2006.01)
(52) U.S. Cl. .................. 369/44.32; 369/53.19
(58) Field of Classification Search ............... 369/44.32, 369/44.34, 53.19
See application file for complete search history.

(56) References Cited

U.S. PATENT DOCUMENTS

| | | | | |
|---|---|---|---|---|
| 5,751,680 A * | 5/1998 | Ishibashi et al. | ........... | 369/44.32 |
| 6,459,664 B1 * | 10/2002 | Yamada et al. | ........... | 369/44.32 |
| 6,842,414 B1 * | 1/2005 | Park | ........... | 369/44.32 |
| 7,054,241 B2 * | 5/2006 | Kondo et al. | ........... | 369/44.32 |
| 7,187,632 B2 * | 3/2007 | Ohno et al. | ........... | 369/44.32 |
| 7,218,588 B2 * | 5/2007 | Arakawa | ........... | 369/44.32 |
| 2002/0060964 A1 * | 5/2002 | Park | ........... | 369/53.19 |
| 2002/0131347 A1 * | 9/2002 | Raaymakers | ........... | 369/44.32 |
| 2003/0147314 A1 * | 8/2003 | Kondo et al. | ........... | 369/44.32 |
| 2003/0179665 A1 * | 9/2003 | Iwazawa et al. | ........... | 369/44.32 |
| 2003/0210628 A1 * | 11/2003 | Park et al. | ........... | 369/44.32 |
| 2004/0085868 A1 * | 5/2004 | Ohno et al. | ........... | 369/44.32 |
| 2005/0117472 A1 * | 6/2005 | Raaymakers | ........... | 369/44.32 |

FOREIGN PATENT DOCUMENTS

| | | |
|---|---|---|
| JP | 10-083549 | 3/1998 |
| JP | 3114661 B | 2/1999 |
| JP | 2000-357338 | 12/2000 |
| JP | 2001-023213 A | 1/2001 |
| JP | 2003-346369 | 12/2003 |

OTHER PUBLICATIONS

Japanese Office Action issued in Japanese Patent Application No. JP 2004-034396, dated Apr. 10, 2007.
Chinese Office Action issued in Chinese Patent Application No. CN 20051000067568, dated Apr. 7, 2006.

* cited by examiner

*Primary Examiner* — Peter Vincent Agustin
(74) *Attorney, Agent, or Firm* — McDermott Will & Emery LLP

(57) ABSTRACT

An information recording and reproducing apparatus for increasing a speed of tilt control, including a portion for storing reference data, a portion for storing sample values data, a portion for obtaining positional information, a stilt servo generator, a tilt adjuster.

6 Claims, 15 Drawing Sheets

INFORMATION RECORDING AND REPRODUCING APPARATUS

BACKGROUND OF THE INVENTION

1. Field of the Invention

The present invention relates to an information recording and reproducing apparatus for recording and/or reproducing information by irradiating a disk with laser light. In particular, the present invention is preferably used in an optical disk apparatus for recording/reproducing information with respect to a laminated disk such as a digital versatile disk (DVD).

2. Description of the Related Art

A conventional optical disk apparatus is provided with focus control means and tracking control means as means for allowing laser light to follow a track. In addition, an optical disk apparatus for recording/reproducing information with respect to a high-density disk such as a DVD drive is provided with so-called tilt control means for controlling an optical axis of laser light to be vertical to a disk surface.

Regarding such tilt control, for example, JP 2001-23213 A describes an optical disk apparatus for controlling a tilt using a focus control signal. More specifically, by inputting a focus control signal at a current recording/reproducing position in a tilt control circuit, and controlling a tilt correction mechanism based on the focus control signal, the influence of a tilt is cancelled in synchronization with a tilt amount due to disk rotation. This enables stable recording/reproduction to be performed with respect to an optical disk having surface wobbling.

The tilt control means shown in JP 2001-23213 A is preferably used in the case where the state of surface wobbling varies dynamically owing to the change in temperature in a drive and the like. However, in a laminated disk such as a DVD, the state of surface wobbling does not vary so much even when the temperature in a drive changes. Thus, the dynamic tilt control as in JP2001-23213 A is not necessarily required.

Furthermore, in the case of seeking a recording/reproducing position during recording/reproduction, when a tilt is detected from, for example, the state of a reflected beam one by one, a period of time from the end of a seek to the start of recording/reproduction becomes long. In the field of an optical disk apparatus, there is a demand for an increase in speed of a recording/reproducing operation. In this respect, a further increase in speed is required even in tilt control during a seek operation.

SUMMARY OF THE INVENTION

An object of the present invention is to increase the speed of tilt control while suppressing a useless tilt control operation.

To achieve such an object, according to the present invention, there is provided an information recording and reproducing apparatus for recording and/or reproducing information by irradiating a disk with laser light, including: reference value data storing means for previously storing reference value data in accordance with a focus bias voltage when a predetermined radial position on a reference disk is focused; sample value data obtaining means for detecting a focus bias voltage when a predetermined radial position on a target disk with respect to which information is to be recorded/reproduced is focused, prior to a commencement of a recording/reproducing operation, and obtaining sample value data in accordance with the detected focus bias voltage under a condition that the sample value data is associated with the radial position; positional information obtaining means for obtaining positional information on a recording/reproducing position on the target disk; tilt servo signal generating means for generating a tilt servo signal at the recording/reproducing position on the target disk, based on a differential value between the reference value data stored in the reference value data storing means and the sample value data obtained by the sample value data obtaining means, and the positional information obtained by the positional information obtaining means; and tilt adjusting means for adjusting a tilt of laser light with respect to a disk surface in accordance with the tilt servo signal generated by the tilt servo signal generating means.

In the invention, the sample value data obtaining means may obtain sample value data under a condition that the sample value data are associated with a plurality of radial positions, and the tilt servo signal generating means may obtain a value in accordance with a tilt amount at the radial position from a differential value between the sample value data obtained from the radial position on the target disk and the reference value data, and generate a tilt servo signal at the recording/reproducing position based on the obtained value.

At this time, the tilt servo signal generating means may generate a tilt servo signal at the recording/reproducing position, with a value in accordance with a tilt amount at a radial position immediately before or immediately after the recording/reproducing position among the radial positions on the target disk being a value in accordance with a tilt amount at the recording/reproducing position.

In addition, the tilt servo signal generating means may obtain a value in accordance with a tilt amount at the recording/reproducing position by linearly approximating a value in accordance with a tilt amount at the recording/reproducing position from values in accordance with tilt amounts at two radial positions sandwiching the recording/reproducing position among the radial positions on the target disk, and generate a tilt servo signal based on the value in accordance with the obtained tilt amount.

In addition, in the present invention, a radial position set by the sample value data obtaining means may be set so as to correspond to a radial position set by the reference value data storing means. At this time, the tilt servo signal generating means may obtain a value in accordance with a tilt amount at the radial position based on a differential value between the sample value data and the reference value data corresponding to the sample value data.

Furthermore, in the present invention, when a recording/reproducing position on the target disk is sought, the tilt servo signal generating means may generate a tilt servo signal with a target position of a seek destination being the recording/reproducing position.

In the present invention, a "value in accordance with a tilt amount" widely includes a value varied in accordance with a tilt amount such as a tilt servo signal, as well as a tilt amount itself.

According to the present invention, an appropriate tilt servo signal is predicted and generated at a recording/reproducing position from information regarding the recording/reproducing position. Therefore, it is not necessary to actually measure a tilt amount at a recording/reproducing position, which can simplify and speed the tilt control.

In particular, if a tilt servo signal is generated in accordance with a target position of a seek destination as described above, a tilt amount at a recording/reproducing position after a seek can be predicted, so tilt control can be remarkably increased in speed during a seek. For example, if a tilt amount at a recording/reproducing position after a seek is predicted and set during a seek period, an operation can be shifted rapidly to a recording/reproducing operation after a seek.

BRIEF DESCRIPTION OF THE DRAWINGS

The above-mentioned and other objects and novel features of the present invention will be more completely clear upon reading the following description of embodiments with reference to the following attached drawings in which.

DESCRIPTION OF PREFERRED EMBODIMENTS

Hereinafter, the present invention will be described by way of examples with reference to the drawings. It should be noted that the following embodiments are shown merely for an illustrative purpose, and do not limit the scope of the present invention.

In this embodiment, a DVD+RW (hereinafter, referred to as a disk 100) is used as a disk (target disk) with respect to which information is to be recorded/reproduced. The disk 100 is divided into a lead-in area, a data area, and a lead-out area in this order from an inner circumference. The disk 100 is provided with a spiral groove from the inner circumference to an outer circumference, and data is recorded with respect to the groove.

Herein, the groove is wobbled in a radial direction, and this wobbling allows address information to be held. That is, a phase modulation section called an address in pre-groove (ADIP) is inserted in a monotonous wobbling section at a constant period, and when such a phase modulation section is scanned with a beam, address information on the groove is read to be reproduced from a change in the intensity of reflected light. In the ADIP of the lead-in area, various pieces of control data with respect to the disk are recorded by phase modulation.

Figure 1:
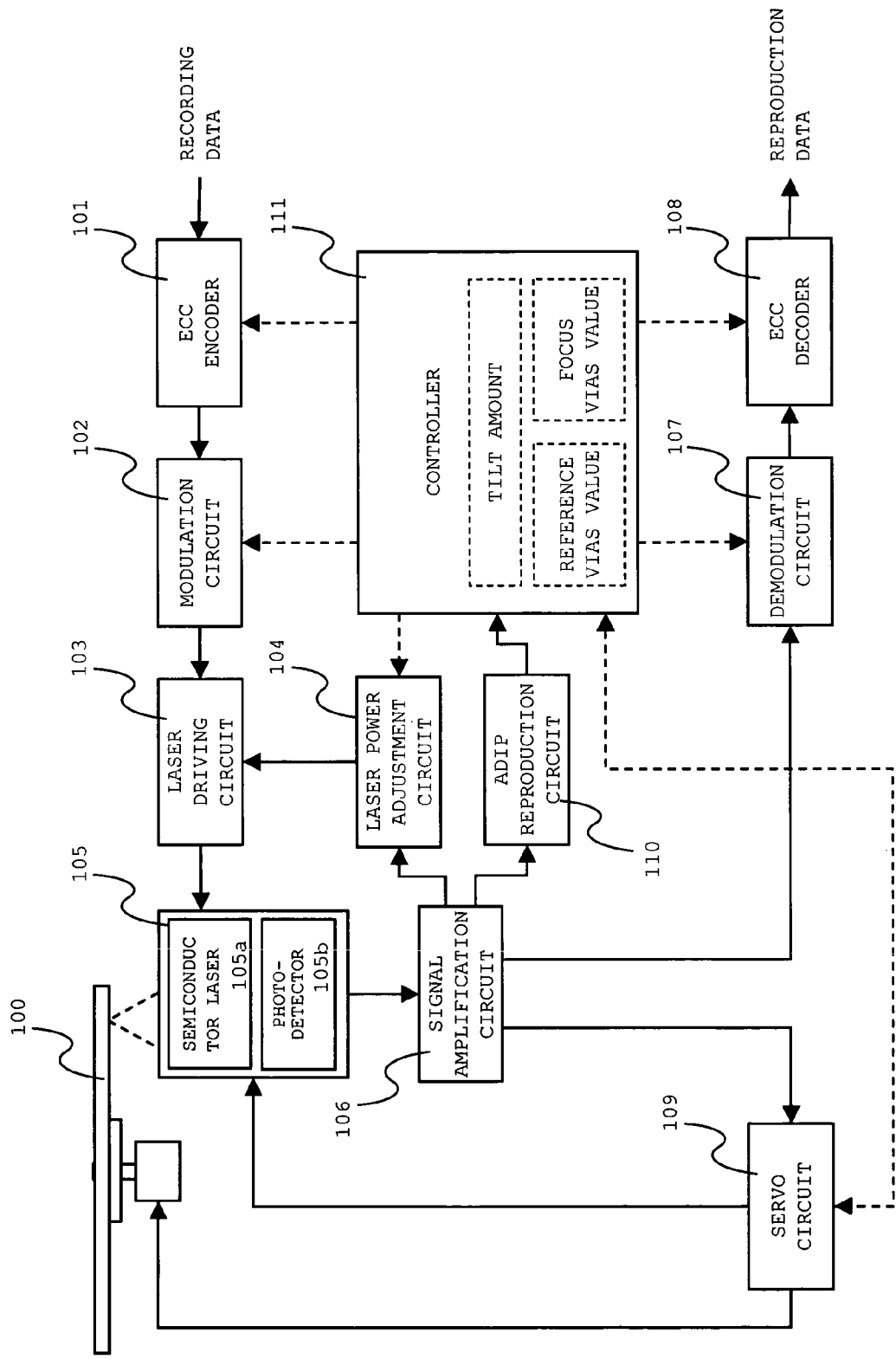
FIG. 1 shows a configuration of an optical disk apparatus according to an embodiment of the present invention.

FIG. 1 shows a configuration of an optical disk apparatus according to an embodiment of the present invention.

As shown in the figure, the optical disk apparatus includes an ECC encoder 101, a modulation circuit 102, a laser driving circuit 103, a laser power adjustment circuit 104, an optical pickup 105, a signal amplification circuit 106, a demodulation circuit 107, an ECC decoder 108, a servo circuit 109, an ADIP reproduction circuit 110, and a controller 111.

The ECC encoder 101 adds an error correction code to input recording data, and outputs it to the modulation circuit 102. The modulation circuit 102 subjects the input recording data to predetermined modulation, and generates and outputs a recording signal to the laser driving circuit 103. The laser driving circuit 103 outputs a driving signal in accordance with a recording signal from the modulation circuit 102 to a semiconductor laser 105a during recording, and outputs a driving signal for irradiation of laser light with a single intensity to the semiconductor laser 105a during reproduction. Herein, a laser power is set to be the one adjusted and set by the laser power adjustment circuit 104.

The laser power adjustment circuit 104 adjusts and sets a laser power at an optimum value based on the state of a reproduction RF signal detected during trial writing. Herein, the adjustment of a laser power is performed using a known γ-method. The γ-value of the disk is included in the ADIP in the lead-in area.

The optical pickup 105 includes the semiconductor laser 105a and a photodetector 105b, and writes/reads data with respect to a disk by condensing laser light onto the groove. The optical pickup 105 includes: an objective lens actuator (described later) for adjusting an irradiation state of laser light with respect to the groove; and an optical system for guiding laser light emitted from the semiconductor laser 105a to an objective lens and guiding light reflected from the disk 100 to the photodetector 105b.

The signal amplification circuit 106 amplifies a signal received from the photodetector 105b, generates various kinds of signals as a result of operation processing, and outputs them to the corresponding circuit. The demodulation circuit 107 demodulates a reproduction RF signal input from the signal amplification circuit 106 to generate reproduction data, and outputs it to the ECC decoder 108. The ECC decoder 108 subjects the reproduction data input from the demodulation circuit 107 to an error correction, and outputs the resultant data to a circuit in a later stage.

The servo circuit 109 generates a focus servo signal and a tracking servo signal from a focus error signal and a tracking error signal input from the signal amplification circuit 106, and outputs them to an objective lens actuator of the optical pickup 105. Furthermore, the servo circuit 109 generates a motor servo signal from a wobble signal input from the signal amplification circuit 106, and outputs it to a disk drive motor. Furthermore, the servo circuit 109 generates a tilt servo signal from a tilt error signal supplied from the controller 111, and outputs it to the objective lens actuator of the optical pickup 105.

The servo circuit 109 also has a function of driving a pickup feeding mechanism (not shown), and feeding the optical pickup 105 in a disk radial direction. The controller 111 controls the servo circuit 109 to allow it to seek a scanning position of the optical pickup 105, and allows a recording/reproducing position to access the predetermined position on the disk.

The ADIP reproduction circuit 110 reproduces address information and various kinds of pieces of control information from the wobble signal input from the signal amplification circuit 106, and outputs them to the controller 111. The controller 111 stores various kinds of data in a storage memory, and controls each portion in accordance with a previously set program. The control operation during tilt servo by the controller 111 will be described later in detail.

Figure 2:
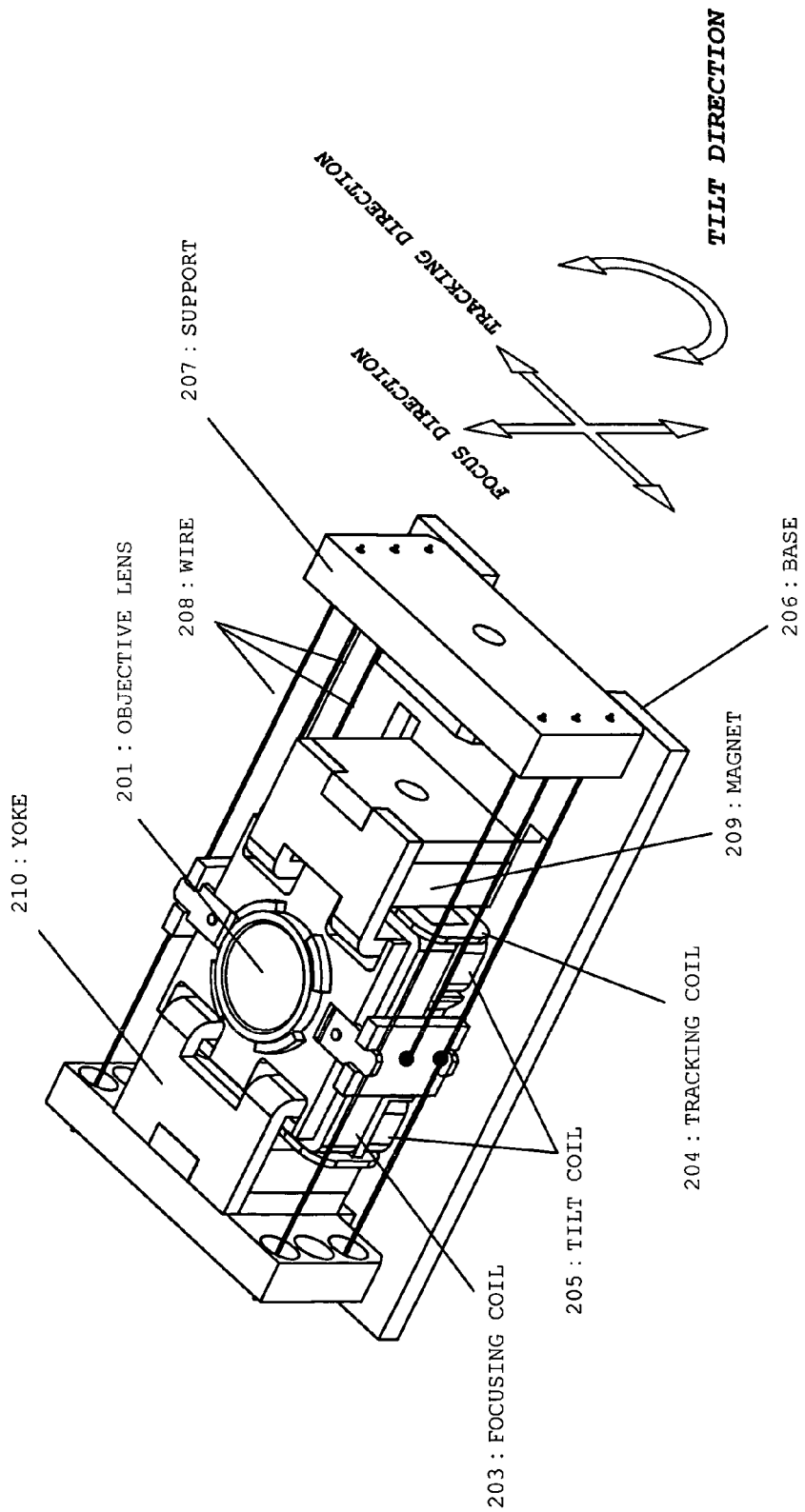
FIG. 2 shows a configuration of an objective lens actuator according to the embodiment of the present invention.
Figure 3:
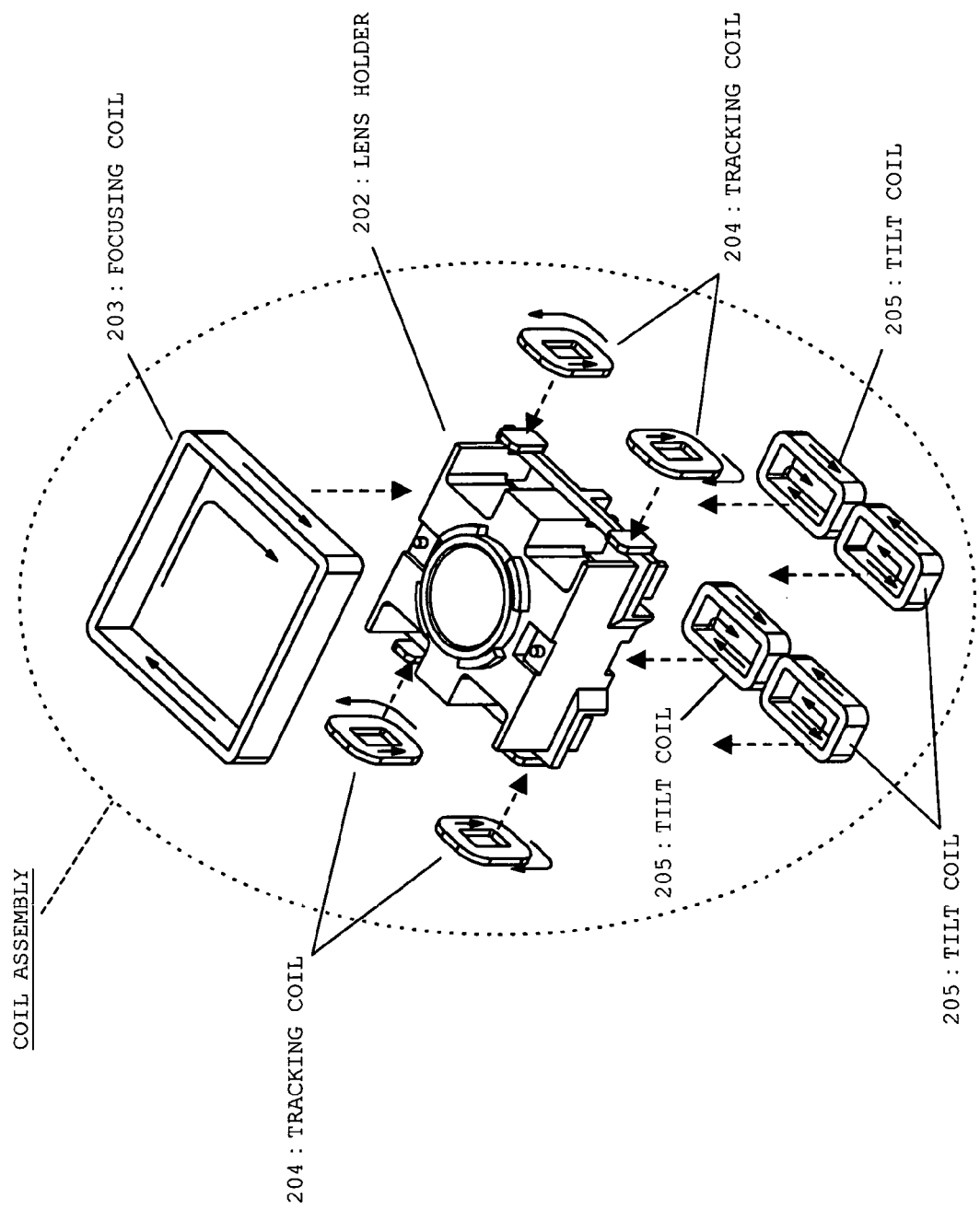
FIG. 3 shows a configuration of the objective lens actuator according to this embodiment of the present invention.

FIGS. 2 and 3 each show a configuration of the objective lens actuator.

As shown in FIG. 3, a coil assembly is composed of a lens holder 202, a focusing coil 203, four tracking coils 204, and four tilt coils 205. In FIG. 3, a solid arrow provided to each coil represents a winding direction of each coil.

The focusing coil 203 is wound in the same shape as that of an outer circumferential shape of the lens holder 202 so that an inner circumferential frame thereof is slightly larger than an outer circumference of the lens holder 202, and thereafter, cemented with a resin. Then, the focusing coil 203 is fitted to the lens holder 202 from above, and attached thereto with an adhesive.

Each tracking coil 204 is wound in the same shape as an outer circumferential shape of a projection formed on an outer circumference of the lens holder 202 so that an inner circumferential frame thereof is slightly larger than an outer circumference of the projection formed on the outer circumference of the lens holder 202, and thereafter, cemented with a resin. Then, the tracking coil 204 is fitted to the projection from a side and attached thereto with an adhesive.

Each tilt coil 205 is wound so that an inner circumferential frame thereof has such a size as to come into contact with a pair of nail portions formed on a reverse surface side of the lens holder 202, and thereafter, cemented with a resin. Then, the tilt coil 205 is fitted to the nail portions from below, and attached thereto with an adhesive.

FIG. 2 shows a schematic perspective view of the objective lens actuator.

The lens holder 202 with each coil mounted thereon as described above is suspended with wires 208 on a support 207 set on a base 206, in such a manner that each coil is inserted in a magnetic gap between a magnet 209 and a yoke 210.

The wires 208 are electrically connected to corresponding coils, and a servo signal is supplied to each coil via the wires. By changing the bias value of a servo signal flowing through each coil, a displacement amount of the objective lens 201 can be changed in a focus direction, a tracking direction, and a tilt direction. Furthermore, by inverting the direction of a servo signal flowing through each coil, the driving direction of the objective lens 201 can be inverted appropriately.

Figure 4:
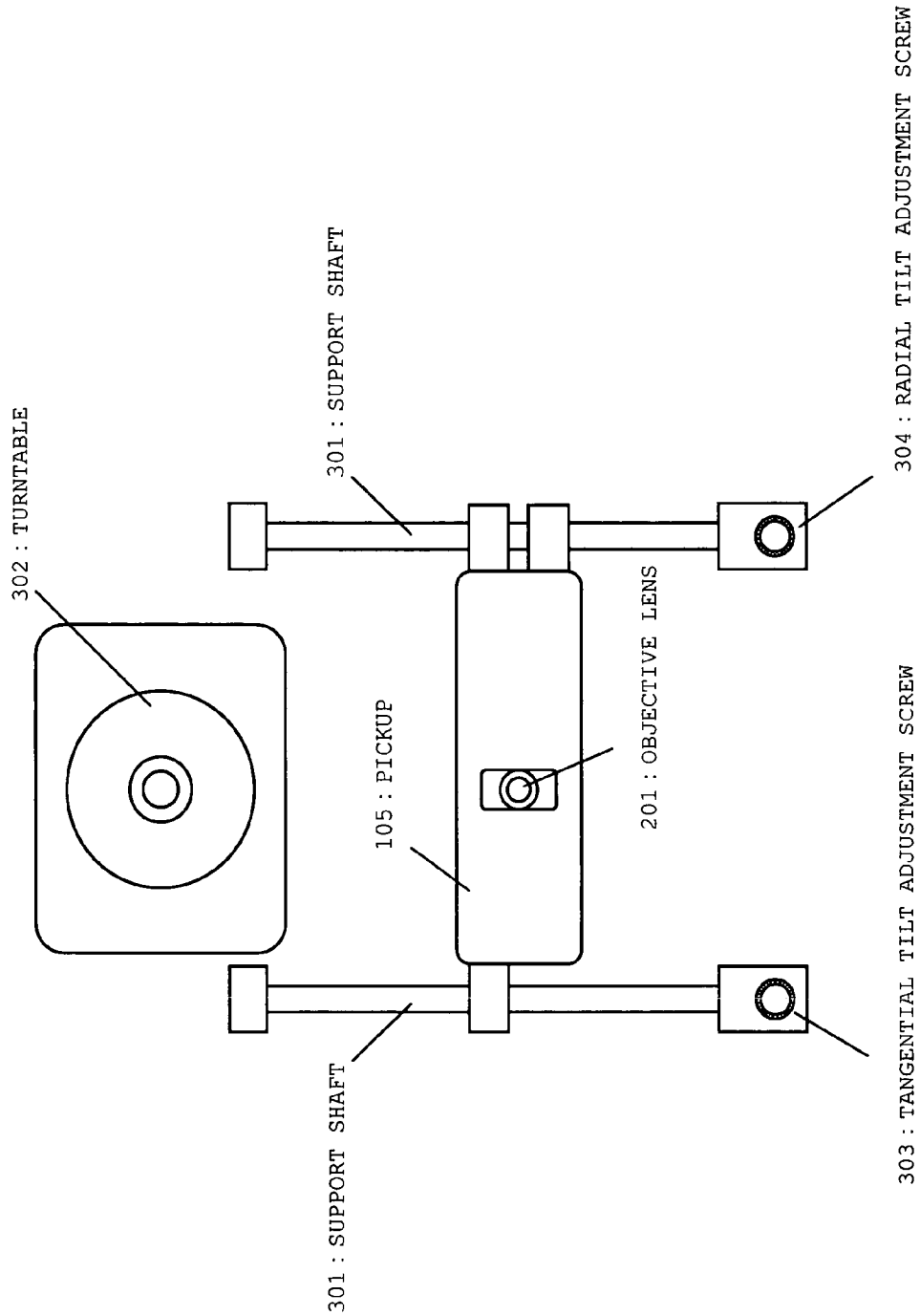
FIG. 4 shows a configuration of a pickup feeding mechanism according to this embodiment of the present invention.

FIG. 4 shows a main configuration of a support mechanism for guiding and supporting the optical pickup 105 in a disk radial direction. FIG. 4 is a view of the support mechanism seen from above.

The optical pickup 105 is supported by a pair of support shafts 301 slidably in a radial direction of a turntable 302. Herein, the objective lens 201 of the optical pickup 105 is provided so that laser light is moved in a radial direction of the disk 100 along with the movement of the optical pickup 105, when the disk 100 is mounted on the turntable 302.

Each support shaft 301 is provided so that one end thereof can be displaced in a vertical direction by adjusting a tangential tilt adjustment screw 303 and a radial tilt adjustment screw 304. By adjusting the tangential tilt adjustment screw 303 and the radial tilt adjustment screw 304 during assembly of the optical disk apparatus, the tilt state of the optical pickup 105 is adjusted mechanically.

Such an adjustment is performed by: placing a reference disk (having the same disk format as that of the disk 100) having a substrate with a high flatness precision, such as a glass substrate, on the turntable 302, setting a focus servo and a tracking servo in an ON state and setting a tilt servo in an OFF state; and, under this condition, adjusting the tangential tilt adjustment screw 303 and the radial tilt adjustment screw 304 so that a reproduced signal becomes most satisfactory. More specifically, the tangential tilt adjustment screw 303 and the radial tilt adjustment screw 304 are adjusted so that a reproduction RF signal, when information is reproduced from the reference disk, becomes maximum, or a jitter of a reproduced signal becomes minimum.

After the above-mentioned mechanical adjustment is performed, the optical pickup 105 is fed to a predetermined radial position on the reference disk, and subjected to focus servo at that position. At this time, the tilt serve is turned off (the tracking servo may be turned on/off). Then, the bias value of the focus servo signal in a focus ON state is output from the servo circuit 109 to the controller 111, and stored in a storage memory as a reference bias value.

Based on the reference bias value, tilt control is performed with respect to the disk 100 (target disk). Hereinafter, various embodiments in which such tilt control is embodied will be described sequentially.

Embodiment 1

Figure 5:
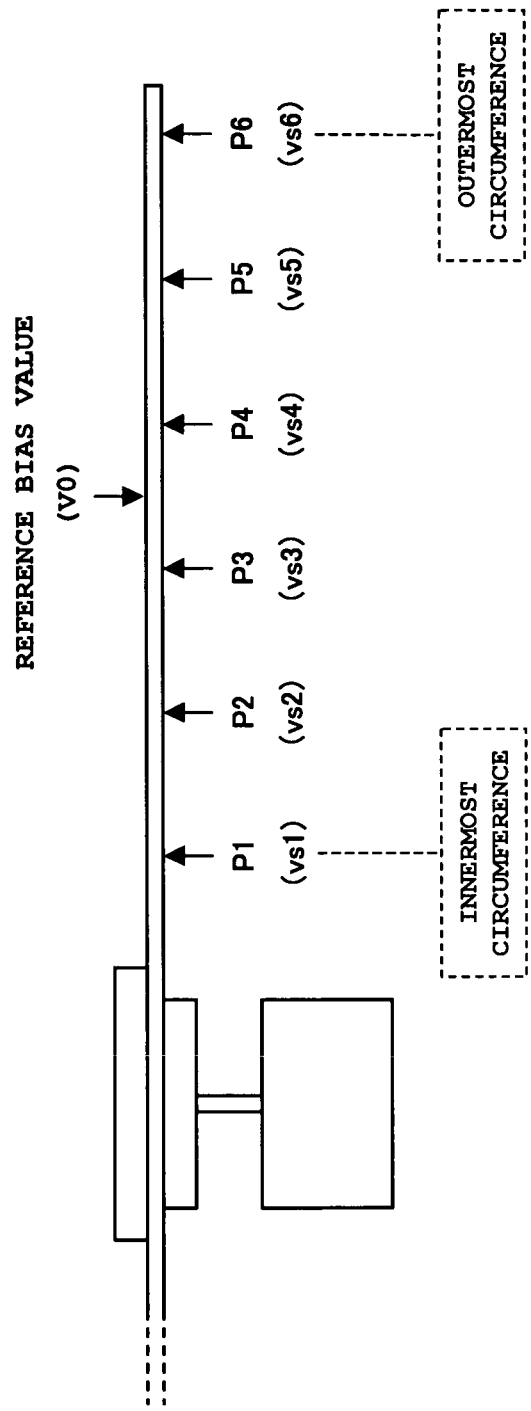
FIG. 5 is a view illustrating how to obtain a tilt amount Ti according to Embodiment 1 of the present invention.

FIG. 5 shows an outline of a tilt control operation in this embodiment.

In this embodiment, during assembly, a reference bias value V0 is obtained from only one radial position on the above-mentioned reference disk and stored in the controller 111. Herein, the position at which the reference bias value V0 is obtained is set, for example, at a point positioned substantially at the center of a region from a disk innermost circumference to a disk outermost circumference among radial positions of the disk 100. Furthermore, the reference bias value V0 is obtained by sequentially sampling bias values of a focus servo signal of one round of the disk at that point, and averaging them.

In this embodiment, when the disk 100 (target disk) is placed on the optical disk apparatus, the optical pickup 105 accesses previously determined 6 radial positions P1 to P6 prior to a recording/reproducing operation, and bias values vs1 to vs6 of a focus servo signal are obtained at respective radial positions. More specifically, bias values of a focus servo signal when the optical pickup 105 is subjected to focus servo at the radial positions P1 to P6 are output from the servo circuit 109 to the controller 111. The controller 111 sequentially samples bias values of a focus servo signal of one round of the disk, and average them to obtain focus bias values vs1 to vs6 with respect to the respective radial positions P1 to P6, in the same as in the above-mentioned reference bias value V0. Then, the obtained focus bias values vs1 to vs6 are associated with the respective radial positions P1 to P6 and stored in a sample value memory.

After that, the controller 111 calculates tilt angles θ1 to θ6 of the disk 100 at the respective radial positions P1 to P6 based on the reference bias value V0 and the focus bias values vs1 to vs6. More specifically, bias differences Δvs1 to Δvs6 ($\Delta vs_n = vs_n - V0$) between the reference bias value V0 and the focus bias values vs1 to vs6 are obtained, and the obtained bias differences Δvs1 to Δvs6 are converted to displacement amounts Δd1 to Δd6 of the disk surface of the disk 100 with respect to the disk surface of the reference disk. At this time, Δdn has a positive/negative polarity in accordance with Δvsn. Then, based on distances r1 to r6 from the disk inner most circumferential position to the respective radial positions P1 to P6 and the above-mentioned displacement amounts Δd1 to Δd6, the tilt angles θ1 to θ6 of the disk 100 at the respective radial positions P1 to P6 are obtained.

Herein, the tilt angle $\theta_n$ is obtained, for example, by calculating $\theta_n = \tan^{-1}\{(\Delta d_{n+1} - \Delta d_n)/(r_{n+1} - r_n)\}$. Alternatively, the tilt angle $\theta_n$ may be obtained by calculating $\theta_n = \tan^{-1}(\Delta d_n/r_n)$. In any case, the tilt angle $\theta_n$ has a positive/negative polarity in accordance with $\Delta d_n$.

As described above, the optical pickup 105 is mechanically adjusted with respect to the reference disk with a high flatness precision, so the obtained tilt angles θ1 to θ6 are substantially matched with the tilt amounts of laser light at the respective radial positions P1 to P6. The controller 111 detects tilt amounts Ti1 to Ti6 at the respective radial positions P1 to P6 from the obtained tilt angles θ1 to θ6. Then, the controller 111 approximates the tilt amount Ti with respect to the entire area of the disk 100 based on the detected tilt amounts Ti1 to Ti6, and during recording/reproduction, outputs a tilt error signal in accordance with the approximated value Ti to the servo circuit 109.

The above-mentioned radial positions P1 to P6 are set, for example, so that the radial position P1 and the radial position P6 are placed at an innermost circumferential position and an outermost circumferential position of the disk 100, respectively, and the radial positions P2 to P5 are placed at positions substantially equally dividing a region between the radial position P1 and the radial position P6. Alternatively, the radial positions P2 to P5 may be set so that an interval between two adjacent positions becomes smaller toward an outer circumferential portion. Because of this, the tilt amount Ti can be approximated with relatively satisfactory precision even with respect to large surface wobbling that easily occurs in the outer circumferential portion.

Figure 6:
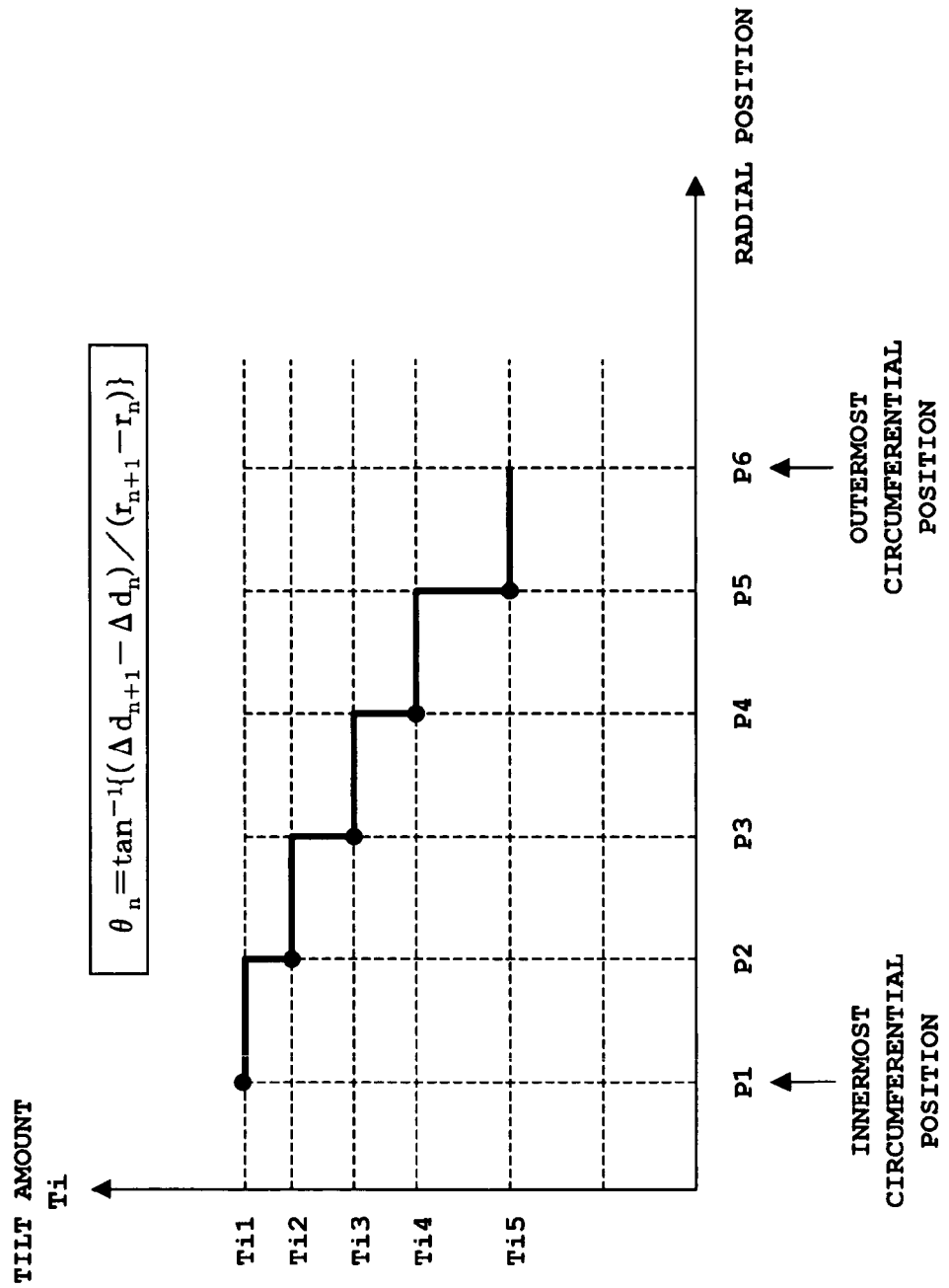
FIG. 6 is a view illustrating an approximate example of the tilt amount Ti according to Embodiment 1 of the present invention.

FIG. 6 shows an approximate example of the tilt amount Ti at a recording/reproducing position.

As shown in FIG. 6, in this approximate embodiment, when the recording/reproducing position is placed between adjacent two radial positions among the above-mentioned radial positions P1 to P6, the tilt amount Ti of the position among the radial positions P1 to P5, which is placed immediately before the recording/reproducing position, is set to be the tilt amount of the recording/reproducing position. At this time, the tilt amount Ti at each of the radial positions P1 to P5 is obtained, for example, from the above-mentioned calculation expression: $\theta_n = \tan^{-1}\{(\Delta d_{n+1} - \Delta d_n)/(r_{n+1} - r_n)\}$.

The tilt amount Ti of the position among the radial positions P2 to P6, which is placed immediately after the recording/reproducing position, may be set to be the tilt amount of the recording/reproducing position, in place of the tilt amount of the position among the radial positions P1 to P5 which is placed immediately before the recording/reproducing position. At this time, the tilt amount Ti of each of the radial positions P2 to P6 is obtained, for example, from a calculation expression: $\theta_n = \tan^{-1}\{(\Delta d_n - \Delta d_{n-1})/(r_n - r_{n-1})\}$.

Figure 7:
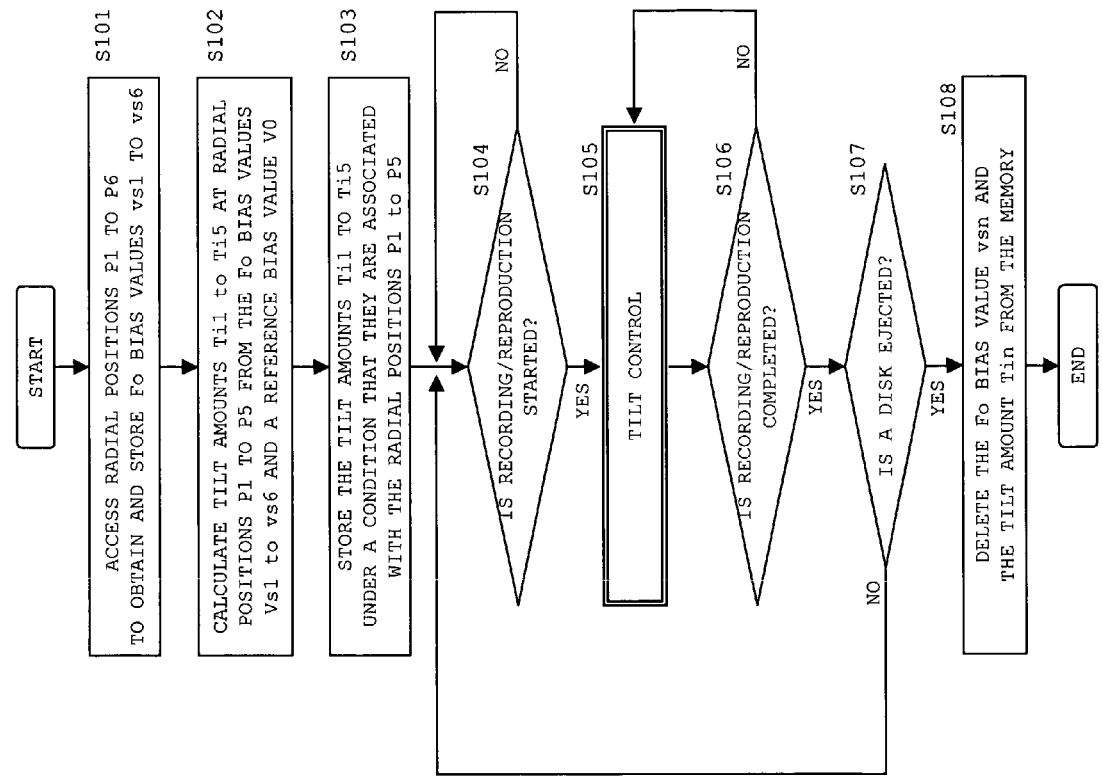
FIG. 7 is a processing flowchart of tilt control according to Embodiment 1 of the present invention.

FIG. 7 shows a processing flow of tilt control in this embodiment. The processing flow may use an approximation method of a tilt amount shown in FIG. 6.

When a disk is mounted on the optical disk apparatus, the controller 111 allows the optical pickup 105 to access the above-mentioned radial positions P1 to P6, obtains the focus bias values vs1 to vs6 at the respective radial positions from the servo circuit 109, and stores them in the storage memory under the condition that they are associated with the radial positions (S101). Then, the above-mentioned arithmetic operation is performed based on the reference bias value V0 stored in the storage memory during assembly and the focus bias values vs1 to vs 6 obtained in S101, and the tilt amounts Ti1 to Ti5 at the respective radial positions P1 to P5 are calculated (S102). Then, the calculated tilt amounts Ti1 to Ti5 are stored under the condition that they are associated with the respective radial positions P1 to P5 (S103).

In the above-mentioned calculation in S102, as described above, while the bias differences Δvs1 to Δvs6, the displacement amounts Δd1 to Δd6 of the disk surface, and the tilt angles θ1 to θ5 are calculated, the tilt amounts Ti1 to Ti5 may be obtained finally. Alternatively, a calculation algorithm from which such intermediate operations are omitted is set in the controller 111, and the tilt amounts Ti1 to Ti5 may be directly obtained from the focus bias values vs1 to vs6 obtained in S101 in accordance with the algorithm.

Thus, when the tilt amounts Ti1 to Ti5 at the radial positions P1 to P5 are stored in the controller 111, and thereafter, a recording/reproducing instruction is input (S104), the controller 111 generates a tilt error signal based on the tilt amounts Ti1 to Ti5 stored in S103, and outputs the tilt error signal to the servo circuit 109 (S105) during the recording/reproducing operation (S106: NO). When the recording/reproducing operation is completed (S106: YES), if the disk is not ejected (S107: NO), the process returns to S104 and stands by until the commencement of the subsequent recording/reproducing operation. When the disk is ejected (S107: YES), the focus bias values vs1 to vs 6 and the tilt amounts Ti1 to Ti5 stored in the storage memory are deleted (S108), and the tilt control with respect to the disk is completed.

Figure 8:
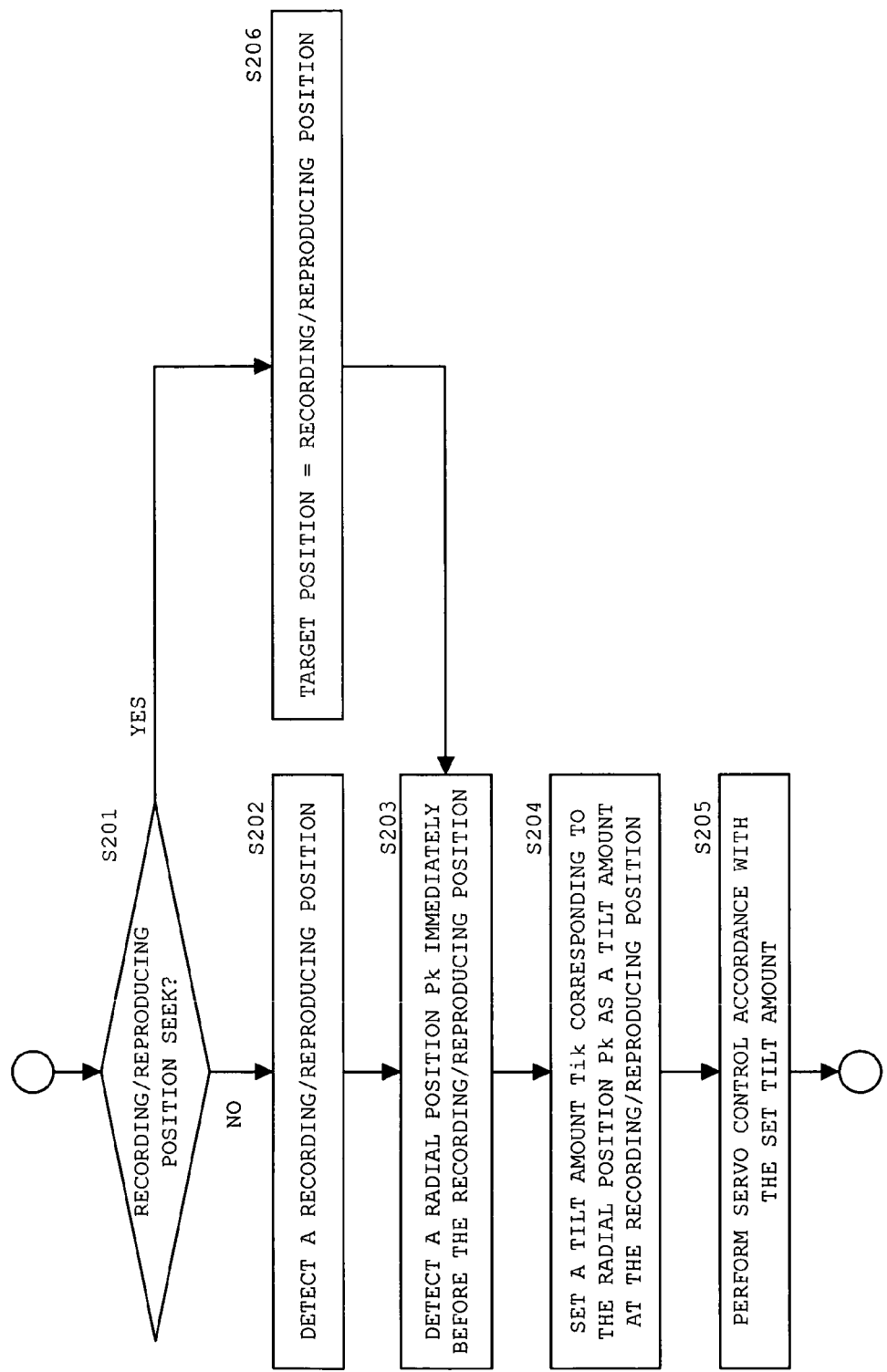
FIG. 8 is a processing flowchart of the tilt control according to Embodiment 1 of the present invention.

FIG. 8 shows a processing flow of the tilt control in S105.

During the recording/reproducing operation, the controller 111 detects whether or not a seek occurs at the recording/reproducing position (S201). When a seek does not occur, the radial position in accordance with the current recording/reproducing position is detected based on the address data from the ADIP reproduction circuit 110 (S202). Then, a radial position Pk immediately before the current recording/reproducing position among the radial positions P1 to P6 is detected (S203), and a tilt amount Tik stored in the storage memory as the tilt amount corresponding to the radial position Pk is set as the tilt amount at the current recording/reproducing position (S204). Furthermore, a tilt error signal is generated from the set tilt amount Tik, and supplied to the servo circuit 109 (S205). Thus, the tilt control at the current recording/reproducing position is performed.

On the other hand, when the controller 111 detects that a seek occurs at the recording/reproducing position during the recording/reproducing operation (S201: YES), the controller 111 detects a radial position in accordance with the recording/reproducing position after the seek based on a seek target address (S206). Then, a radial position Pk placed immediately before the radial position after the seek among the radial positions P1 to P6 is detected (S203), and the tilt amount Tik stored in the storage memory as the tilt amount corresponding to the radial position Pk is set as the tilt amount at the recording/reproducing position after the seek (S204). Furthermore, a tilt error signal is generated from the set tilt amount Tik, and supplied to the servo circuit 109 (S205). Thus, the tilt control at the recording/reproducing position after the seek is performed.

In such a processing flow, the tilt amount at the radial position close to the current recording/reproducing position among the tilt amounts Ti1 to Ti5 at the radial positions P1 to P5 obtained prior to the recording/reproducing operation is set as the tilt amount at the current recording/reproducing position. Therefore, the actual measurement of the tilt amount at the current recording/reproducing position can be omitted, and the tilt control at the current recording/reproducing position can be made easy and increased in speed.

In particular, in the case where a seek occurs at the recording/reproducing position, the tilt amount at the recording/reproducing position after the seek can be predicted from a seek target address, so the tilt control at a time of occurrence of the seek can be increased in speed remarkably. For example, if the tilt amount at the recording/reproducing position after the seek is predicted during a seek period, the process can be shifted rapidly to the recording/reproducing operation after the seek.

In the above description, the tilt amount of the position among the radial positions P1 to P5, which is placed immediately before the current recording/reproducing position or the recording/reproducing position after the seek, is set to be the tilt amount at the recording/reproducing position. However, as described above, the tilt amount Ti at the position among the radial positions P2 to P6, which is placed immediately after the recording/reproducing position, may be set as the tilt amount at the recording/reproducing position. At this time, the tilt amount Ti at each of the radial positions P2 to P6 is obtained, for example, from a calculation expression: $\theta n = \tan^{-1}\{(\Delta d_n - \Delta d_{n-1})/(r_n - r_{n-1})\}$.

Furthermore, in the above description, the tilt amounts Ti1 to Ti5 at the radial positions P1 to P5 are previously calculated and stored in the storage memory. However, only the focus bias values vs1 to vs6 at the radial positions P1 to P6 may be stored in the storage memory, and the tilt amounts Ti1 to Ti5 may be calculated each time, based on the corresponding focus bias value and the reference bias value during the recording/reproducing operation.

Figure 9:
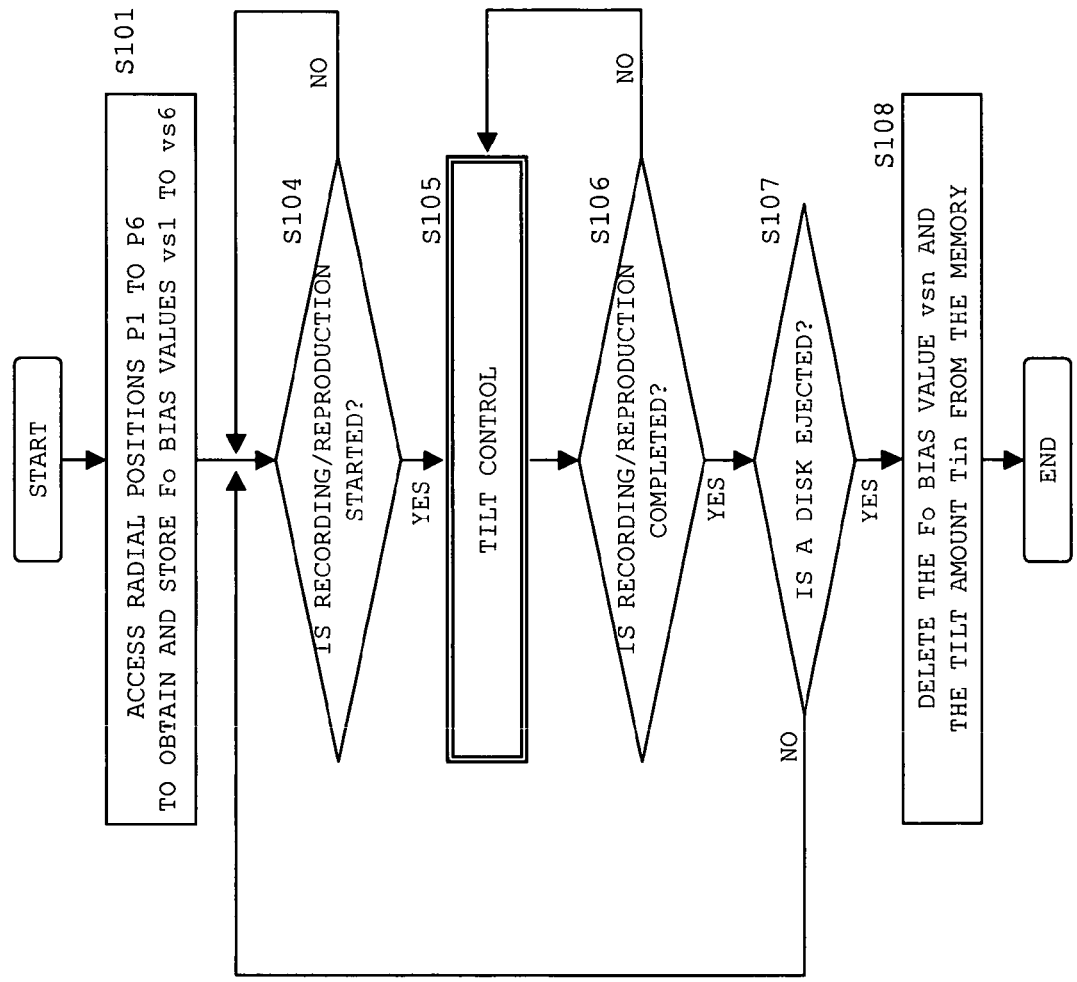
FIG. 9 shows a modified example of the processing chart of the tilt control according to Embodiment 1 of the present invention.
Figure 10:
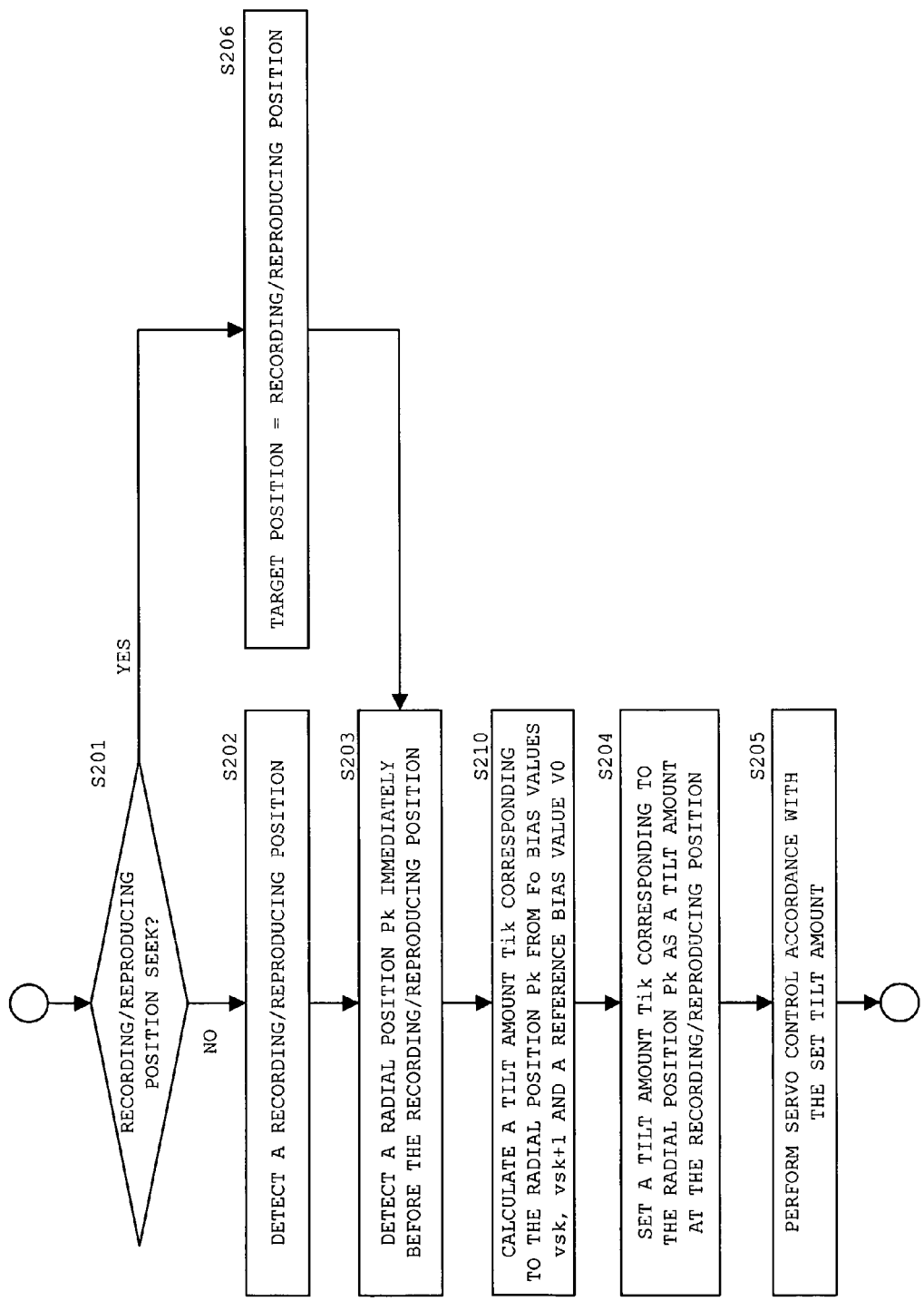
FIG. 10 shows a modified example of the processing chart of the tilt control according to Embodiment 1 of the present invention.

FIGS. 9 and 10 each show a processing flow in such a case.

The processing flow in FIG. 9 corresponds to a processing flow in FIG. 7, and in this flow, S102 and S103 that correspond to the processing of calculating and storing the tilt amounts Ti1 to Ti5 are omitted, compared with the processing flow in FIG. 7. That is, in the processing flow in FIG. 9, only the bias values vs1 to vs6 at the radial positions P1 to P6 are obtained in S101, and stored in the storage memory.

Furthermore, the processing flow in FIG. 10 corresponds to the processing flow in FIG. 8, and in this flow, S210 that corresponds to the processing of calculating the tilt amount at the recording/reproducing position is added, compared with the processing flow in FIG. 8. More specifically, in the processing flow in FIG. 10, after the radial position Pk immediately before the recording/reproducing position is detected (S203), the tilt amount Tik at the radial position Pk is calculated from the reference bias value V0 stored in the storage memory and the corresponding focus bias value (S210). At this time, the tilt amount Tik is obtained based on the above-mentioned calculation expression: $\theta_n = \tan^{-1}\{(\Delta d_{n+1} - \Delta d_n)/(r_{n+1} - r_n)\}$. Then, the calculated tilt amount Tik is set as the tilt amount at the recording/reproducing position (S204), and the tilt control is performed (S205).

Embodiment 2

Figure 11:
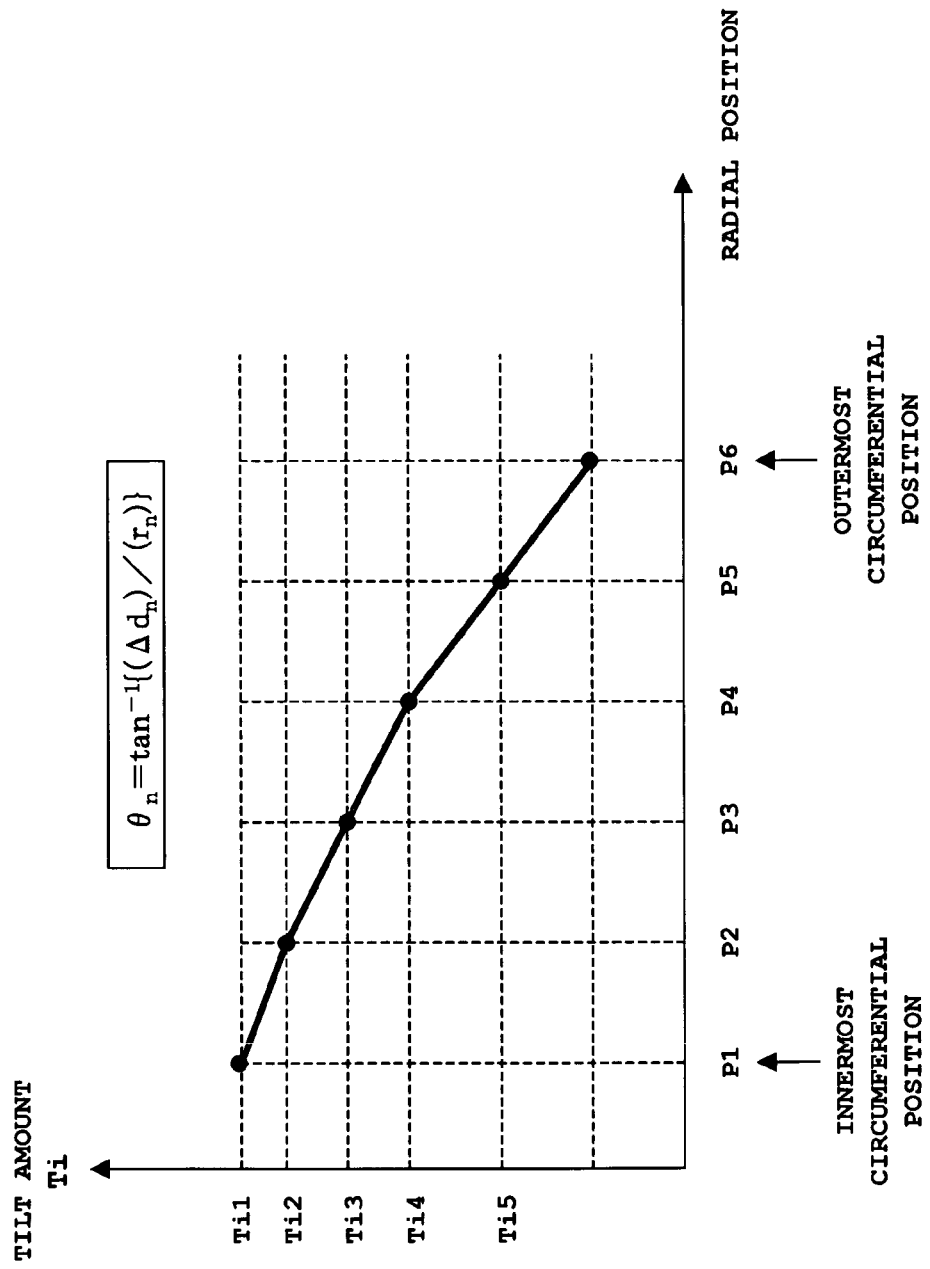
FIG. 11 is a view illustrating an approximate example of a tilt amount Ti according to Embodiment 2 of the present invention.

In Embodiment 1, the tilt amount Ti at a position placed immediately before (or immediately after) a recording/reproducing position among the radial positions P1 to P6 is set as the tilt amount at the recording/reproducing position. In this embodiment, the tilt amount at the recording/reproducing position is set by linear approximation of tilt amounts Ti, Ti+1 at positions immediately before and immediately after the recording/reproducing position among the radial positions P1 to P6, as shown in FIG. 11.

Figure 12:
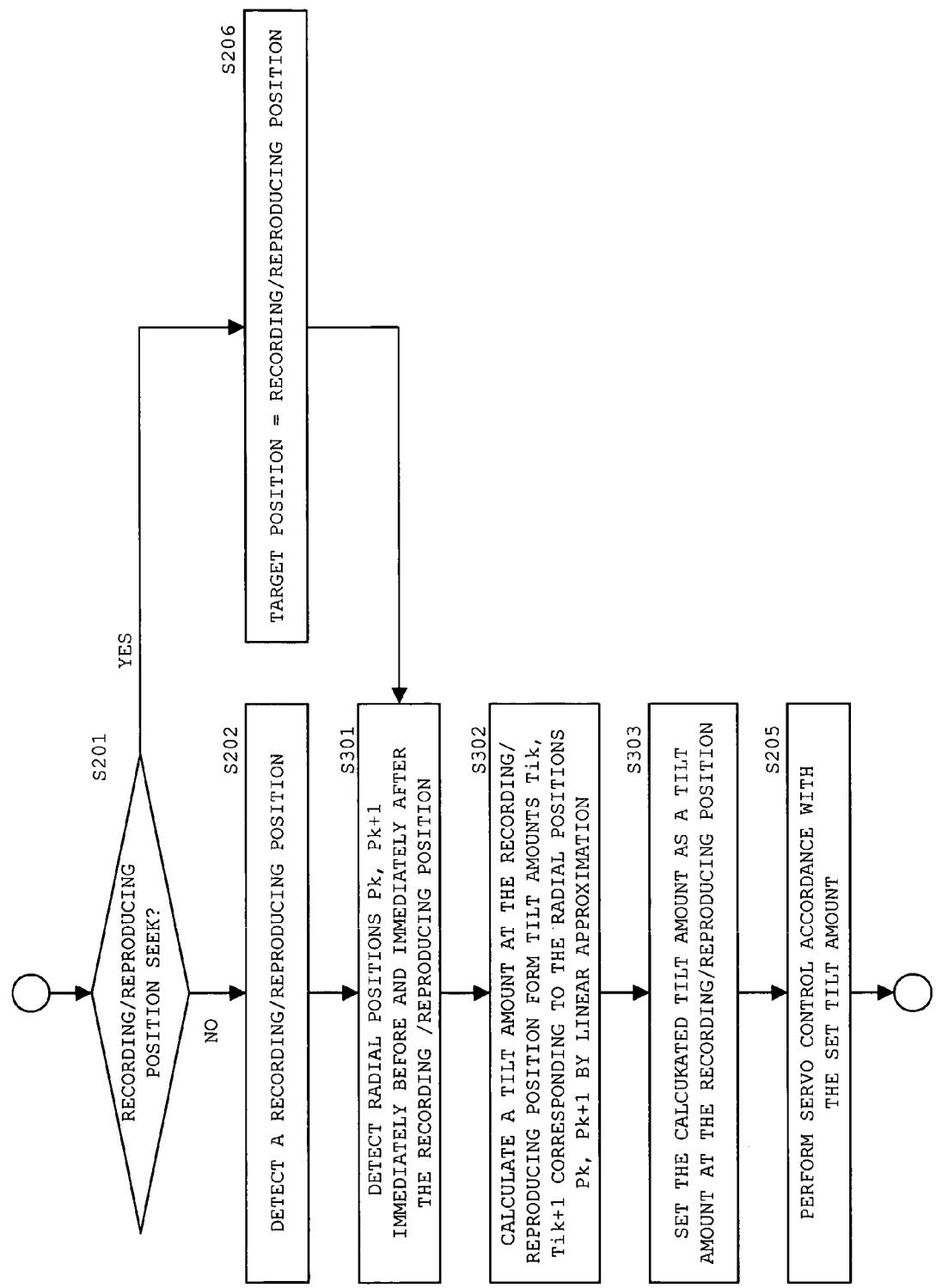
FIG. 12 is a processing flowchart of tilt control according to Embodiment 2 of the present invention.

FIG. 12 shows a processing flow of tilt control during recording/reproduction.

The processing flow in FIG. 12 corresponds to the processing flow in FIG. 8, and compared with the processing flow in FIG. 8, S301 to S303 that correspond to the processing of setting the tilt amount at a recording/reproducing position by linear approximation of tilt amounts Ti, Ti+1 at positions immediately before and immediately after the recording/reproducing position among the radial positions P1 to P6 are added. More specifically, in the processing flow in FIG. 12, after radial positions Pk, Pk+1 immediately before and immediately after the recording/reproducing position are detected (S301), the tilt amount at the recording/reproducing position is calculated by linear approximation of Tik, Tik+1 at the radial positions Pk, Pk+1 stored in a storage memory (S302). Then, the calculated tilt amount is set as the tilt amount at the recording/reproducing position (S303), and tilt control is performed (S205).

According to this embodiment, the processing becomes more complicated than that in Embodiment 1 of the present invention in accordance with the calculation of a tilt amount by linear approximation. However, the setting precision of a tilt amount can be enhanced compared with the case where the tilt amount is set in stages as in Embodiment 1 of the present invention.

Figure 13:
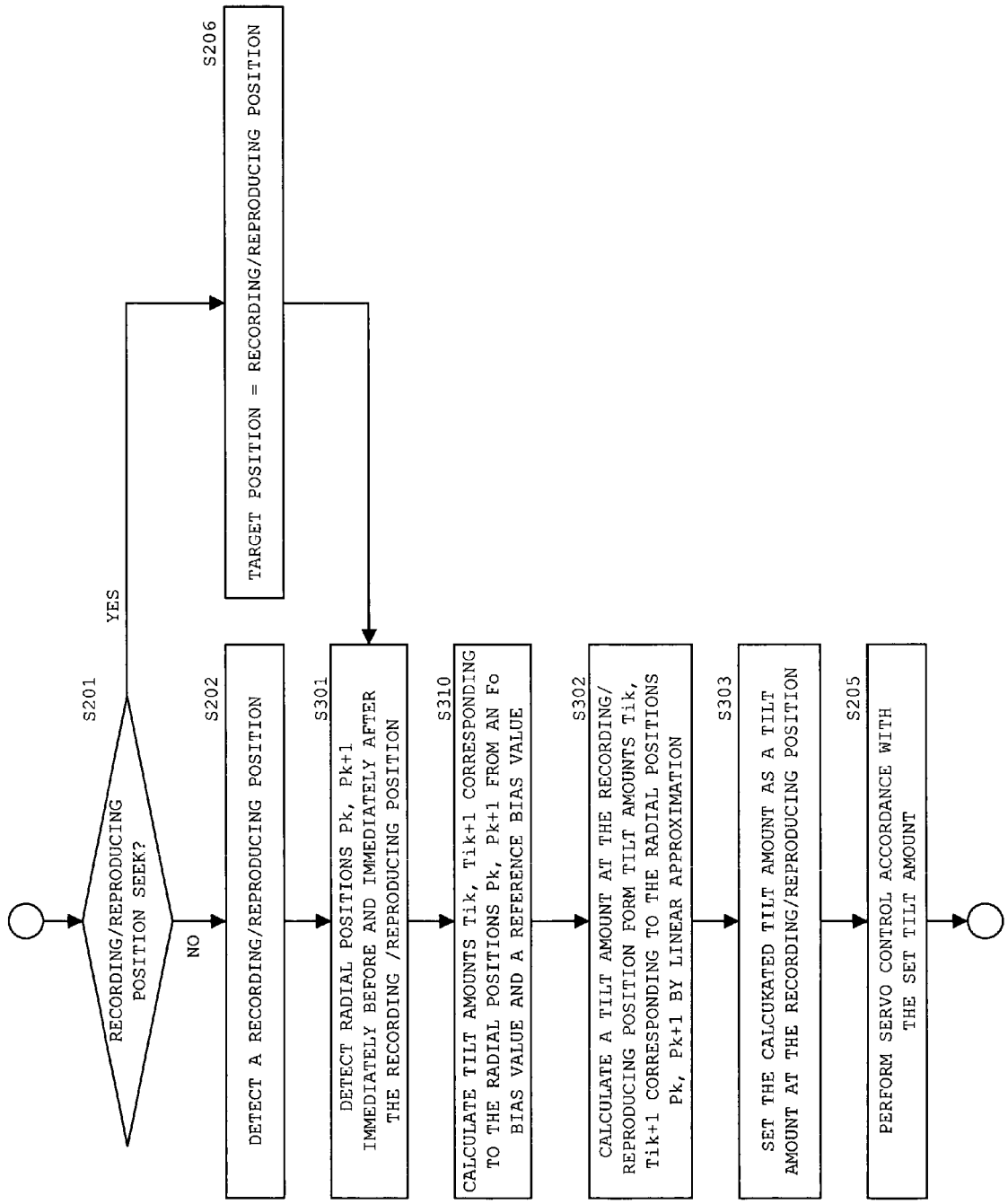
FIG. 13 shows a modified example of the processing flow chart of the tilt control according to Embodiment 2 of the present invention.

Even in this embodiment, in the same way as in the modified example of Embodiment 1 of the present invention, only the focus bias values vs1 to vs6 at the radial positions P1 to P6 may be stored in a storage memory, and the tilt amounts Ti1 to Ti6 may be calculated every time based on the corresponding focus bias values and the reference bias value during a recording/reproducing operation. More specifically, as shown in FIG. 13, S310 is added immediately after S301, and tilt amounts Tik, Tik+1 at radial positions Pk, Pk+1 are calculated from the focus bias values vsk, vsk+1 at the radial positions Pk, Pk+1, and the reference bias value V0. Then, the tilt amount at the recording/reproducing position is linearly approximated based on the calculated tilt amounts Tik, Tik+1 (S302).

In this embodiment, the tilt amount at a recording/reproducing position is linearly approximated based on the tilt amounts Ti, Ti+1 at positions immediately before and immediately after the recording/reproducing position among the radial positions P1 to P6. Therefore, when the tilt amount Tin is obtained based on the calculation expression: $\theta n = \tan^{-1}\{(\Delta d_{n+1} - \Delta d_n)/(r_{n+1} - r_n)\}$, the tilt amount Ti6 at the radial position P6 cannot be obtained, and in the case where the recording/reproducing position is placed between the radial positions P5 and P6, the tilt amount Ti at the recording/reproducing position cannot be obtained by linear approximation. The same holds true for the case where the tilt amount Tin is obtained based on the above-mentioned calculation expression: $\theta n = \tan^{-1}\{(\Delta d_{n-1} - \Delta d_n)/(r_{n+1} - r_n)\}$.

Thus, the tilt amount Tin in this embodiment is preferably calculated, for example, based on the above-mentioned calculation expression: $\theta n = \tan^{-1}(\Delta d_n/r_n)$. Because of this, the tilt amounts Ti1 to Ti6 can be obtained regarding all the radial positions P1 to P6, and hence, the tilt amount Tin can be linearly approximated even in the vicinity of an outer most circumferential portion (section of P5 to P6).

Embodiment 3

Figure 14:
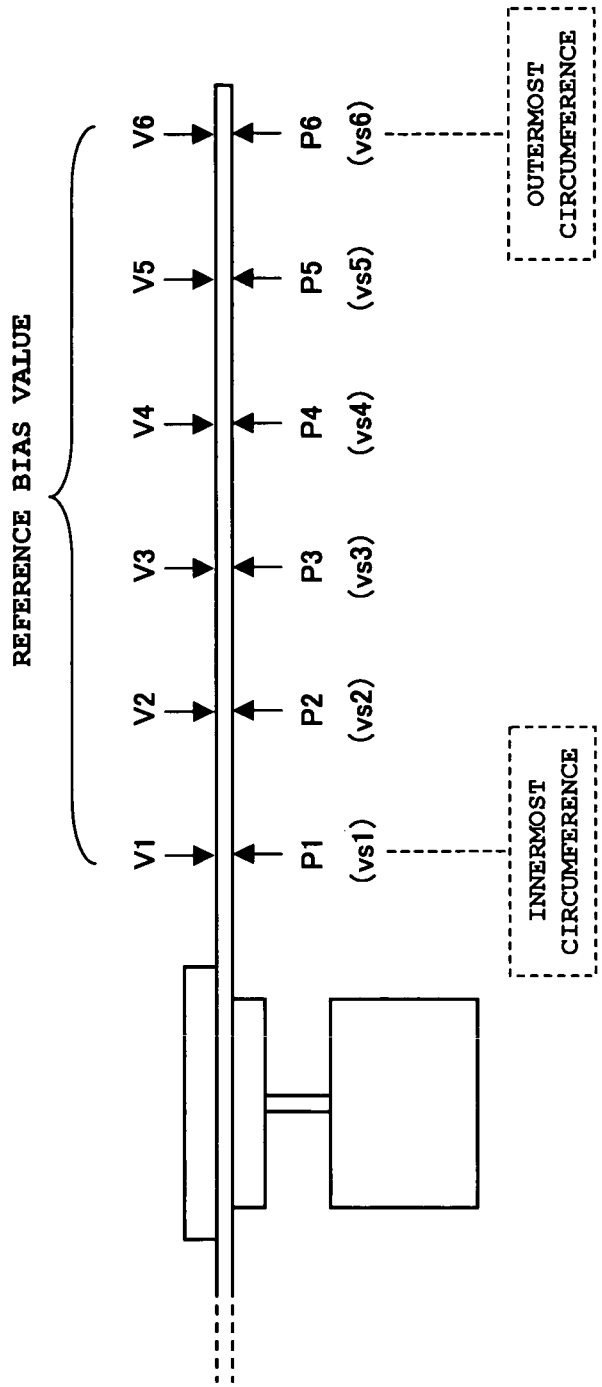
FIG. 14 is a view illustrating how to obtain a tilt amount Ti according to Embodiment 3 of the present invention.

In Embodiments 1 and 2 described above, only one reference bias value V0 is obtained from a reference disk and stored in a storage memory. In contrast, in this embodiment, as shown in FIG. 14, reference bias values V1 to V6 are obtained from positions substantially corresponding to the radial positions P1 to P6 and stored, and the tilt amounts Ti1 to Ti5 at the respective radial positions P1 to P5 are obtained from the reference bias value Vn and the focus bias value vsn corresponding to each other.

Figure 15:
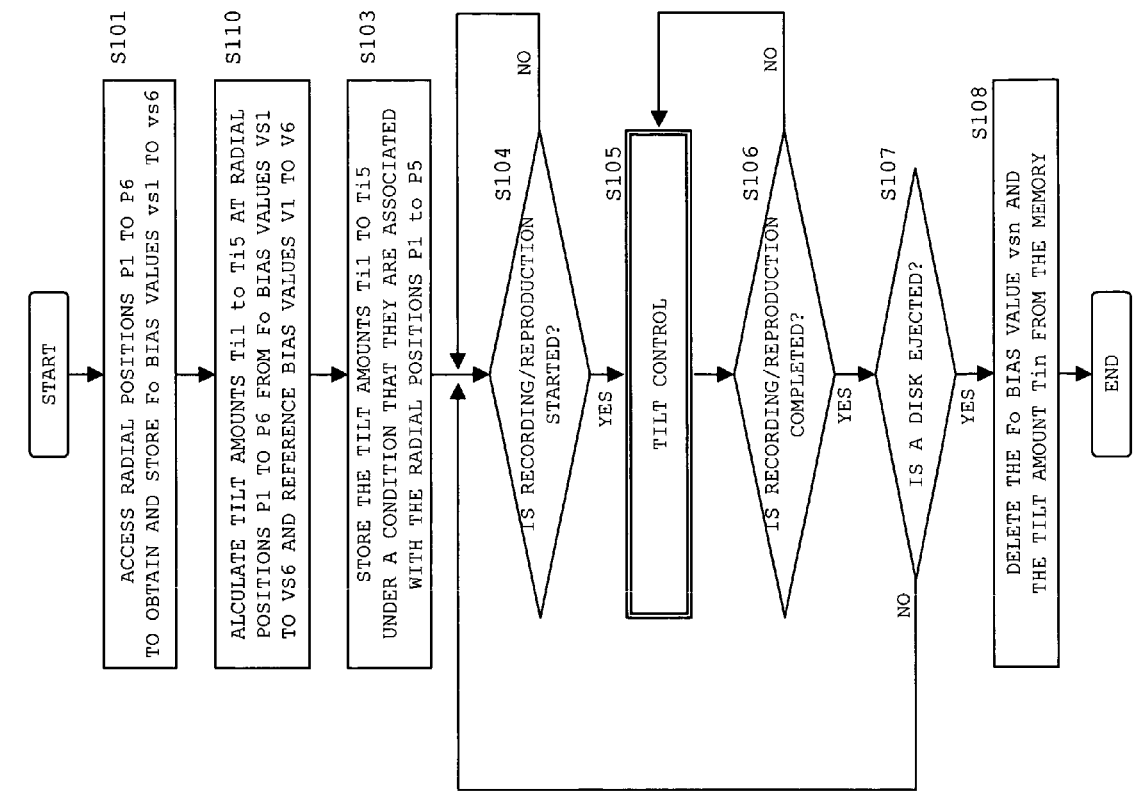
FIG. 15 is a processing flow chart of tilt control according to Embodiment 3 of the present invention.

FIG. 15 shows a processing flow in this embodiment. The processing flow in FIG. 15 corresponds to that in FIG. 7, and compared with the processing flow in FIG. 7, S102 that corresponds to the processing of calculating the tilt amounts Ti1 to Ti5 is changed to S110. More specifically, in the processing flow in FIG. 15, a tilt amount Ti1 at a radial position P1 is calculated from the above-mentioned calculation expression: $\theta n = \tan^{-1}\{(\Delta d_{n+1} - \Delta d_n)/(r_{n+1} - r_n)\}$, based on the reference bias values V1, V2 and the focus bias values vs1, vs2. Similarly, tilt amounts Ti2 to Ti6 at the radial positions P2 to P5 are calculated based on the reference bias values V2 to V6 and the focus bias values vs2 to vs6. Then, the calculated tilt amounts Ti1 to Ti5 are stored in a storage memory under a condition that they are associated with the respective radial positions P1 to P5 (S103).

In this embodiment, only the processing of calculating the tilt amounts Ti1 to Ti5 is different from those in Embodiments 1 and 2 of the present invention, and the other processing steps are performed in the same way as in the processing flow described in each of Embodiments 1 and 2 of the present invention. More specifically, in the case where the tilt amounts Ti1 to Ti5 are stored in the storage memory prior to the recording/reproducing operation, the processing flow in FIG. 8 or FIG. 12 is performed as it is during a recording/reproducing operation. In the case where the tilt amounts Ti1 to Ti5 are calculated sequentially during a recording/reproducing operation (FIGS. 10 and 13), the tilt amounts Ti1 to Ti5 are calculated based on the reference bias value Vn and the focus bias value vsn corresponding to each other.

In this embodiment, the reference bias value Vn and the focus bias value vsn are obtained at a substantially corresponding radial position, and the tilt amounts Ti1 to Ti5 at the respective radial positions P1 to P5 are calculated based on the reference bias value Vn and the focus bias value vsn. Therefore, compared with the case where the tilt amounts Ti1 to Ti5 are calculated based on one bias value V0 as in Embodiments 1 and 2 of the present invention, the calculation precision of the tilt amount at each radial position can be enhanced.

More specifically, in the mechanical adjustment during assembly, as described above, tilt adjustment is performed while an adjustment screw is being adjusted so that the state of a reproduced signal becomes most satisfactory. Therefore, it is difficult to completely remove tilt by such mechanical adjustment. Owing to the error in mechanical adjustment, the reference bias value to be originally set is not the same at all the radial positions, and there may be a slight difference in accordance with a radial position. In such a case, when the tilt amount Tin is calculated based on one bias value V0 as in Embodiments 1 and 2 of the present invention, the bias value V0 may largely shift with respect to the bias value to be originally set, depending upon a radial position. Therefore, the calculated tilt amount Tin may largely shift from an actual tilt amount.

In contrast, if the reference bias value Vn and the focus bias value vsn are obtained at a substantially corresponding radial position, and the tilt amount Tin at each radial position Pn is calculated based on the reference bias value Vn and the focus bias value vsn, as in this embodiment of the present invention, even when there is an error in mechanical adjustment as described above, the reference bias value Vn can be closer to the original bias value than the case to obtain it by using one reference bias value V0 as in Embodiment 1 and 2. Hence, the calculated tilt amount Tin can be suppressed from largely shifting from the actual tilt amount. Thus, according to this embodiment, compared with the case where the tilt amount Tin is calculated based on one bias value V0 as in Embodiments 1 and 2 of the present invention, the calculation precision of a tilt amount at each radial position can be enhanced further.

The embodiment of the present invention has been described above. It should be noted that the present invention is not limited to the above embodiment, and may be variously modified. The embodiment of the present invention can be appropriately varied within a scope of a technical concept shown in the claims.

What is claimed is:

1. An information recording and reproducing apparatus for recording and/or reproducing information by irradiating a disk with laser light, comprising:
   reference value data storing means for previously storing reference value data in accordance with a focus bias voltage when a predetermined radial position on a reference disk is focused;
   sample value data obtaining means for detecting a focus bias voltage when a predetermined radial position on a target disk with respect to which information is to be recorded/reproduced is focused, prior to a commencement of a recording/reproducing operation, and obtaining sample value data in accordance with the detected focus bias voltage under a condition that the sample value data is associated with the radial position;
   positional information obtaining means for obtaining positional information on a recording/reproducing position on the target disk;
   tilt servo signal generating means for generating a tilt servo signal at the recording/reproducing position on the target disk, based on a differential value between the reference value data stored in the reference value data storing means and the sample value data obtained by the sample value data obtaining means, and the positional information obtained by the positional information obtaining means; and
   tilt adjusting means for adjusting a tilt of laser light with respect to a disk surface in accordance with the tilt servo signal generated by the tilt servo signal generating means.

2. An information recording and reproducing apparatus according to claim 1, wherein:
   the sample value data obtaining means obtains sample value data under a condition that the sample value data are associated with a plurality of radial positions; and
   the tilt servo signal generating means obtains a value in accordance with a tilt amount at the radial position from a differential value between the sample value data obtained from the radial position on the target disk and the reference value data, and generates a tilt servo signal at the recording/reproducing position based on the obtained value.

3. An information recording and reproducing apparatus according to claim 2, wherein the tilt servo signal generating means generates a tilt servo signal at the recording/reproducing position, with a value in accordance with a tilt amount at a radial position one of immediately before and immediately after the recording/reproducing position among the radial positions on the target disk being a value in accordance with a tilt amount at the recording/reproducing position.

4. An information recording and reproducing apparatus according to claim 2, wherein the tilt servo signal generating means obtains a value in accordance with a tilt amount at the recording/reproducing position by linearly approximating a value in accordance with a tilt amount at the recording/reproducing position from values in accordance with tilt amounts at two radial positions sandwiching the recording/reproducing position among the radial positions on the target disk, and generates a tilt servo signal based on the value in accordance with the obtained tilt amount.

5. An information recording and reproducing apparatus according to any one of claim 1, 2, 3, or 4, wherein:
- a radial position set by the sample value data obtaining means is set so as to correspond to a radial position set by the reference value data storing means; and
- the tilt servo signal generating means obtains a value in accordance with a tilt amount at the radial position based on a differential value between the sample value data and the reference value data corresponding to the sample value data.

6. An information recording and reproducing apparatus according to any one of claim 1, 2, 3, or 4, wherein, when a recording/reproducing position on the target disk is sought, the tilt servo signal generating means generates a tilt servo signal with a target position of a seek destination being the recording/reproducing position.

* * * * *